United States Patent
Lim et al.

(10) Patent No.: US 6,167,712 B1
(45) Date of Patent: Jan. 2, 2001

(54) METHOD FOR CONTROLLING A REFRIGERATOR HAVING A DIRECTION CONTROL VALVE

(75) Inventors: Jae-Hoon Lim, Suwon; Jae-Eok Shim, Kunpo; Han-Joo Yoo, Kwangju; Yoon-Young Kim, Kwangju; Jang-Hee Lee, Kwangju; Yo-Hyun Song, Kwangju; Chi-Seong Oh, Kwangju; Kyong-Jun Baek, Kwangju; Joong-Yeob Kim, Masan; Young-Rak Kim, Kwangju, all of (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/391,158

(22) Filed: Sep. 8, 1999

(30) Foreign Application Priority Data

Feb. 5, 1999 (KR) .................................................... 99-3910

(51) Int. Cl.⁷ ...................................................... F25B 5/04
(52) U.S. Cl. ................................ 62/113; 62/180; 62/186; 62/197; 62/513
(58) Field of Search ........................... 62/113, 513, 179, 62/180, 182, 186, 198, 199, 200, 157, 158, 231, 197, 196.1

(56) References Cited

U.S. PATENT DOCUMENTS 4,726,160   2/1988   Kawaguchi et al. .
5,142,880 * 9/1992   Bellis ................................. 62/186 X
5,228,307 * 7/1993   Koce ..................................... 62/186
5,406,805 * 4/1995   Radermacher et al. ............ 62/180 X
5,743,100 * 4/1998   Welguisz et al. ................... 62/182 X
5,960,642 * 10/1999  Kim et al. ............................ 62/198 X

* cited by examiner

Primary Examiner—Harry B. Tanner
(74) Attorney, Agent, or Firm—Larson & Taylor, PLC

(57) ABSTRACT

A method for controlling a refrigerator having a direction control valve drives a refrigerating fan for a predetermined time when a refrigerant passage is converted to make a refrigerant from a condenser firstly pass a refrigerating evaporator, and enhances a cooling efficiency by applying a residual cool air of the refrigerating evaporator to a refrigerating compartment, after the refrigerating compartment reaches a steady state in a refrigerator having a refrigerating evaporator embodied as an intercooler evaporator. The method includes the steps of: (a) determining whether a refrigerating compartment temperature sensed by a refrigerating compartment temperature sensor reaches a refrigerating compartment set temperature to determine a steady state of a refrigerating compartment; (b) if it is determined that the steady state of the refrigerating compartment in the step (a), switching a direction control valve, and allowing a refrigerant to firstly pass a refrigerating evaporator; (c) if the direction control valve is switched in the step (b), driving a refrigerating fan for a predetermined time simultaneously driving a freezing fan; and (d) if the refrigerating fan is driven for the predetermined time in the step (c), stopping the refrigerating fan.

2 Claims, 4 Drawing Sheets

METHOD FOR CONTROLLING A REFRIGERATOR HAVING A DIRECTION CONTROL VALVE

BACKGROUND OF THE INVENTION

(1) Field of the Invention

The present invention relates to a method for controlling a refrigerator having a direction control valve. More particularly, it relates to a method for controlling a refrigerator having a direction control valve, which drives a refrigerating fan for a predetermined time when a refrigerant passage is converted to make a refrigerant from a condenser firstly pass a refrigerating evaporator, and enhances a cooling efficiency by applying a residual cool air of the refrigerating evaporator to a refrigerating compartment, after the refrigerating compartment reaches a steady state in a refrigerator having a refrigerating evaporator embodied as an intercooler evaporator.

(2) Description of the Prior Art

Generally, a refrigerator having two evaporators includes two cooling fans for discharging a cool air generated from the evaporators into a freezing compartment and a refrigerating compartment, and a compressor mounted to a lower part of the refrigerator. One of the two cooling fans is mounted in the freezing compartment, and the other one is mounted in the refrigerating compartment. Particularly, a refrigerator having an intercooler refrigerator is as follows.

The refrigerator having an intercooler refrigerator includes: a compressor, a condenser, a first evaporator for cooling a freezing compartment, a second evaporator being an intercooler evaporator for cooling a refrigerating compartment, a first expansion device disposed between the condenser and the first evaporator, a second expansion device disposed between the first evaporator and the second evaporator, a freezing fan for discharging a cool air generated from the first evaporator to a freezing compartment, a refrigerating fan for discharging a cool air generated from the second evaporator to a refrigerating compartment, and a direction control valve selectively directs a refrigerant discharged from the condenser to the first evaporator or the second evaporator. Here, the first evaporator and the second evaporator are connected in series by a refrigerant tube, thereby making a closed loop.

In the aforementioned refrigerator having an intercooler evaporator, a quick cooling operation is firstly performed when initially driving the refrigerator. For the quick cooling operation, a refrigerant passage is formed to make the refrigerant discharged from the condenser sequentially pass the first evaporator and the second evaporator. After that, a refrigerating compartment reaches a steady state, the refrigerant passage is changed to another refrigerant passage which is formed to make the refrigerant discharged from the condenser firstly pass the second evaporator (i.e., an intercooler evaporator) and then pass the first evaporator.

At this time, in the second evaporator being an intercooler evaporator, a heat exchange between a low temperature refrigerant discharged from the first evaporator and a high temperature refrigerant discharged from the condenser occurs, a cooling capacity of the second evaporator gradually disappears. Likewise, As soon as a refrigerant passage directs the second evaporator by switching the direction control valve, the refrigerator stops driving the refrigerating fan.

As a result, a residual cool air remained in the second evaporator during a predetermined time after switching the direction control valve is not used to a cooling cycle, becomes disappeared with the lapse of time, thereby decreasing a cooling efficiency.

SUMMARY OF THE INVENTION

Accordingly, the present invention is directed to a method for controlling a refrigerator having a direction control valve, that substantially obviates one or more of the problems due to limitations and disadvantages of the related art.

It is an objective of the present invention to provide a method for controlling a refrigerator having a direction control valve which drives a refrigerating fan for a predetermined time when a refrigerant passage is converted to make a refrigerant from a condenser firstly pass a refrigerating evaporator, and enhances a cooling efficiency by applying a residual cool air of the refrigerating evaporator to a refrigerating compartment, after the refrigerating compartment reaches a steady state in a refrigerator having a refrigerating evaporator embodied as an intercooler evaporator.

To achieve the above objective, in a control method for a refrigerator including a compressor, a condenser, a freezing compartment temperature sensor and a refrigerating compartment temperature sensor, a freezing evaporator, a refrigerating evaporator being an intercooler evaporator, a freezing fan and a refrigerating fan, and a direction control valve for selectively directing a refrigerant discharged from the condenser to the first evaporator or the second evaporator, the control method for the refrigerator includes the steps of:

(a) determining whether a refrigerating compartment temperature sensed by the refrigerating compartment temperature sensor reaches a refrigerating compartment set temperature to determine a steady state of the refrigerating compartment;

(b) if it is determined that the steady state of the refrigerating compartment in the step (a), switching the direction control valve, and allowing a refrigerant to firstly pass the refrigerating evaporator;

(c) if the direction control valve is switched in the step (b), driving the refrigerating fan for a predetermined time simultaneously driving the freezing fan; and (d) after the refrigerating fan is driven for the predetermined time in the step (c), stopping the refrigerating fan.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

The preferred embodiments of the present invention will now be described in detail with reference to the accompanying drawings.

Figure 1:
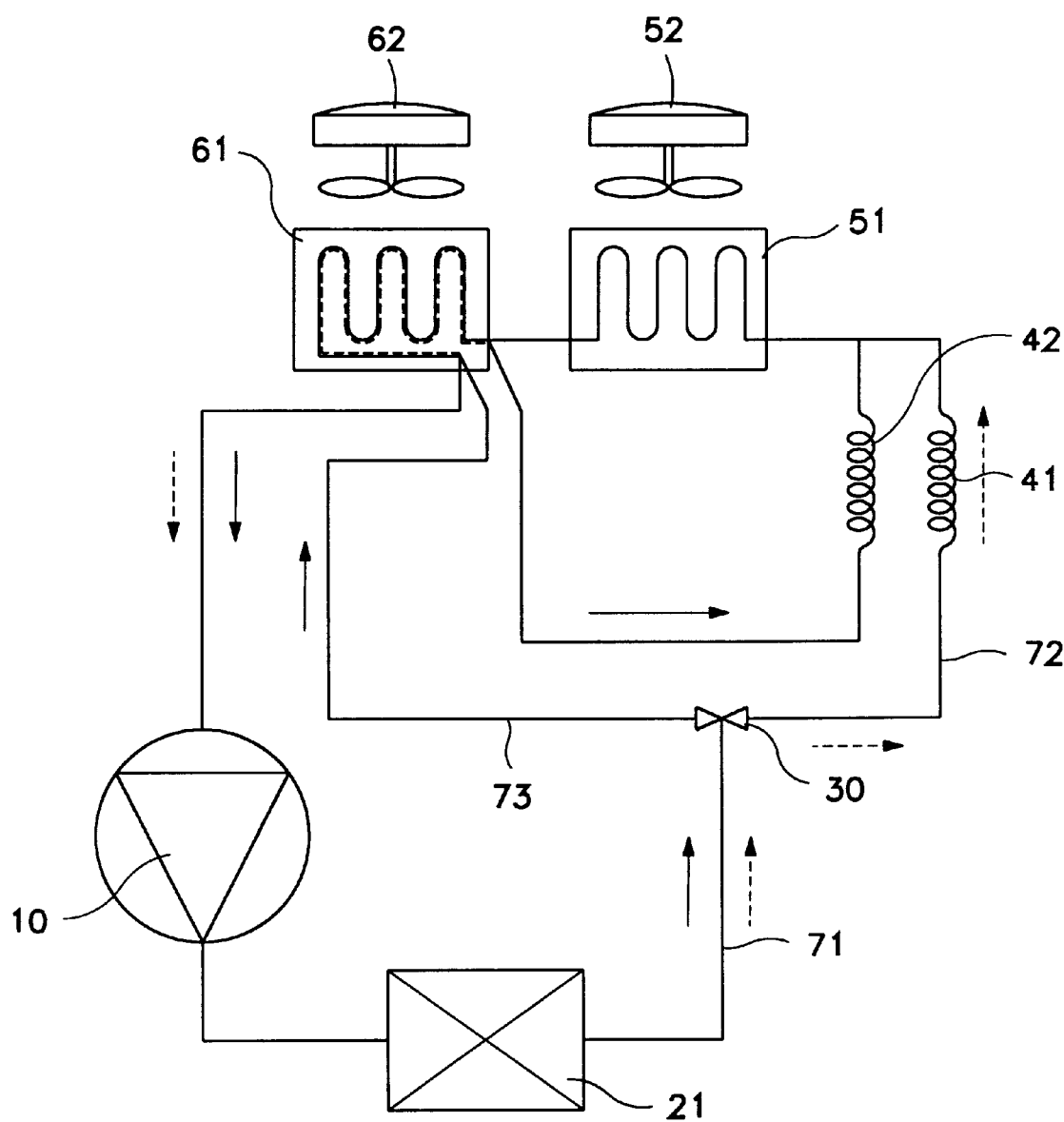
FIG. 1 is a cooling cycle of a refrigerator having a direction control valve.

FIG. 1 is a cooling cycle of a refrigerator having a direction control valve.

As shown in FIG. 1, the refrigerator includes: a compressor 10, a condenser 21, a freezing evaporator 51, a refrigerating evaporator 61 being an intercooler evaporator, a first expansion valve 41 disposed between the condenser 21 and the freezing evaporator 51, a second expansion valve 42 disposed between the freezing evaporator 51 and the refrigerating evaporator 61, and a direction control valve 30 for selectively directing a refrigerant discharged from the condenser to the freezing evaporator 51 or the refrigerating evaporator 61.

A freezing fan 52 is mounted in the vicinity of the freezing evaporator 51. A refrigerating fan 62 is mounted in the vicinity of the refrigerating evaporator 61. The freezing evaporator 51 and the refrigerating evaporator 61 are connected in series.

The refrigerant changes in its phase while flowing along the cooling tube 71 in a direction as indicated by arrows.

Describing more in detail, the refrigerant is evaporated while passing through the freezing and refrigerating evaporators 51 and 61 to absorb heat from its surrounding air, thereby generating cool air. The cool air is forced to the freezing and refrigerating compartments by the freezing fan 52 and the refrigerating fan 62.

In addition, the refrigerant tube connected to a down stream side of the condenser 21 is branched off into a first refrigerant passage 72 for directly directing the refrigerant from the condenser 21 to the freezing evaporator 51 and a second refrigerant passage 73 for directing the refrigerant from the condenser 21 to the freezing evaporator 51 via the refrigerating evaporator 61.

There is provided a direction control valve 30 on a branch point of the first and second refrigerant passages 72 and 73 so that the refrigerant from the condenser 21 can be selectively directed to the first or second refrigerant passage 72 or 73. In FIG. 1, a refrigerant flow toward the first refrigerant passage 72 is indicated as a dotted line arrow, and a refrigerant flow toward the second refrigerant passage 73 is indicated as a solid line arrow.

The first expansion device 41 is disposed on the first refrigerant passage 72 between the condenser 21 and the freezing evaporator 51, and the second expansion device 42 is disposed on the second refrigerant passage 73 between the refrigerating evaporator 61 and the freezing evaporator 51.

Figure 2:
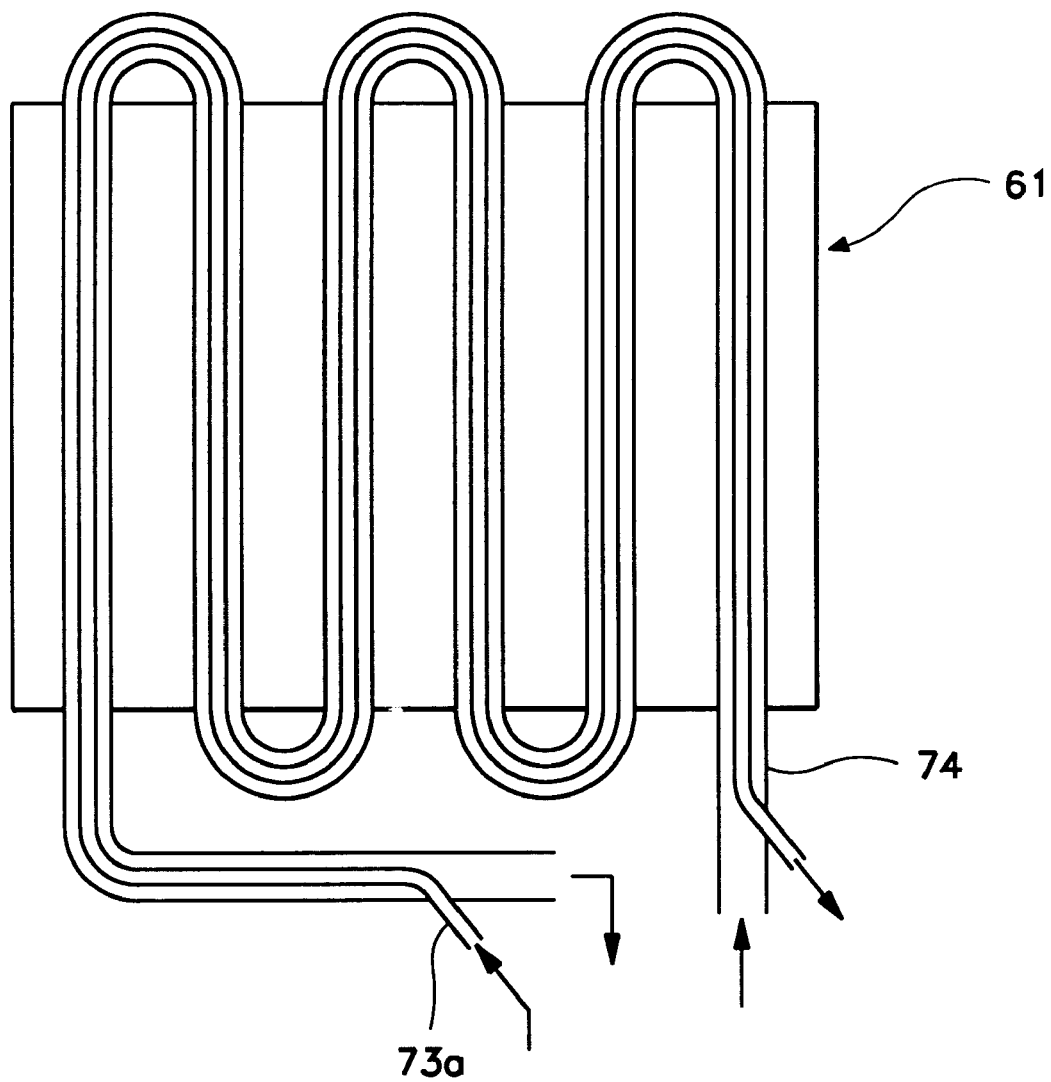
FIG. 2 is a detailed diagram of an example of a refrigerating evaporator used to a refrigerator.

FIG. 2 is a detailed diagram of an example of a refrigerating evaporator used to a refrigerator.

Referring to FIG. 2, the refrigerating evaporator 61 is of an intercooler evaporator comprising an inner tube 73a and an outer tube 74 enclosing the inner tube 73a. The liquid refrigerant fed from the condenser 21 is supplied to the second expansion device 42 through the inner tube 73a while the refrigerant fed from the freezing evaporator 51 is fed to the compressor 10 through the outer tube 74.

At this point, the refrigerant passing through the freezing evaporator 51 is of a two-phase refrigerant that is a mixture of a liquid-phase refrigerant and a vapor-phase refrigerant. The two-phase refrigerant is used for a cooling process of the refrigerating compartment after flowing into the refrigerating evaporator 61 through the outer tube 74. After this, the two-phase refrigerant is changed into the complete vapor-phase refrigerant and is then fed to the compressor 10.

By using the above described intercooler evaporator, the refrigerant, which flows along the outer tube 74 of the refrigerating evaporator 61 after passing through the freezing evaporator 83, is used for cooling the refrigerating compartment as well as for subcooling the liquid refrigerant flowing along the inner tube 73a by a heat exchange. That is, since the liquid refrigerant fed to the second expansion device 42 is subcooled by the heat exchange with the refrigerant flowing along the outer tube 74, efficiency of the refrigerating cycle system is increased.

Figure 3:
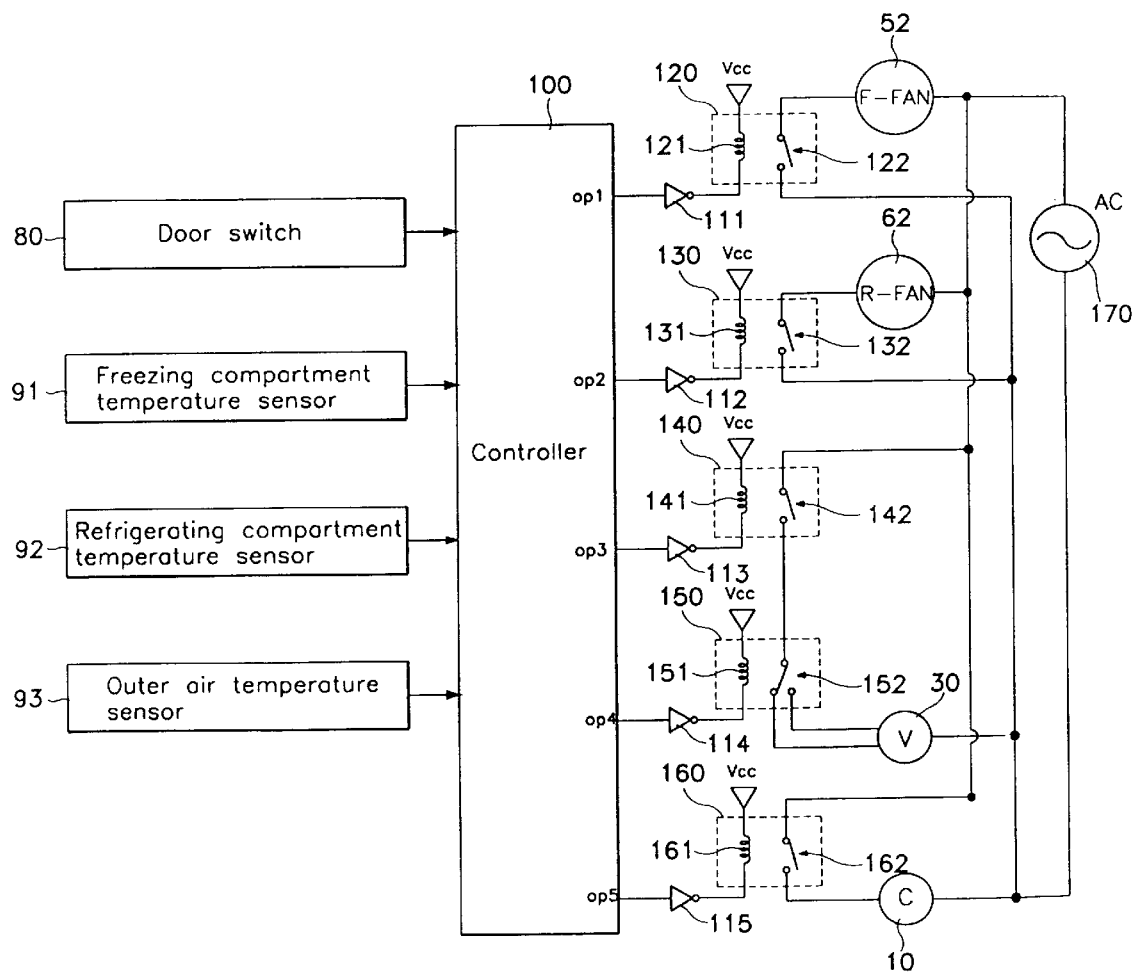
FIG. 3 is a control block diagram of a refrigerator having an intercooler evaporator.

FIG. 3 is a control block diagram of a refrigerator having an intercooler evaporator.

As shown in FIG. 3, the refrigerator includes: a door switch 80 for sensing an opening/closing of a door; a refrigerating compartment temperature sensor 92 for sensing a refrigerating compartment temperature; a freezing compartment temperature sensor 91 for sensing a freezing compartment temperature; an outer air temperature sensor 93 for sensing outer air temperature of the refrigerator; and a controller 100 connected to the output terminals of the above elements. Here, the outer air temperature 93 is not an indispensable element of the refrigerator.

The output terminals OP1–OP5 are connected to a plurality of driver inverters 111–115. The driver inverters 111–115 are connected to the first to fifth relays 120,130, 140,150, and 160, respectively. The first to fifth relays 120,130,140,150, and 160 respectively include the first to fifth relay coils 121,131,141,151, and 161 and the first to fifth relay switches 122,132,142,152, and 162. The relay switches 122,132,142,152, and 162 are respectively connected to the driver inverters 111–115 and a power-supply Vcc.

A coupling relation between each relay and a load will now be described below.

One terminal of the first relay switch 122 of the first relay 120 is connected to one terminal of the freezing fan 52. The other terminal of the freezing fan 52 is connected to one terminal of AC power 170. The other terminal of the first relay switch 122 is connected to the other terminal of AC power 170.

One terminal of the second relay switch 132 of the second relay 130 is connected to one terminal of the refrigerating fan 62. The other terminal of the refrigerating fan 62 is connected to one terminal of AC power 170. The other terminal of the second relay switch 132 is connected to the other terminal of AC power 170.

One terminal of the third relay switch 142 of the third relay 140 is connected to one terminal of AC power 170, and the other terminal of the third relay switch 142 is connected to one side of the fourth relay switch 152.

Two contact points disposed on the other side of the fourth relay switch 152 of the fourth relay 150 are connected to two terminals disposed on one side of the direction control valve 30. The other side of the direction control valve 30 is connected to the other terminal of AC power 170.

The third relay 140 turns on or off a power-supply of the direction control valve. The fourth relay 140 switches a direction of the direction control valve 30. According to that the fourth relay 150 is connected to which one between the two terminals disposed on one side of the direction control valve 30, the refrigerant from the condenser 21 is selectively provided to the first refrigerant passage 72 or the second refrigerant passage 73. Specifically, if the direction control valve 30 is changed from on-state to off state, the refrigerant from the condenser 21 is directed to the second refrigerant passage 73.

One terminal of the fifth relay switch 162 of the fifth relay 160 is connected to one terminal of AC power 170. The other terminal of the relay switch 162 is connected to one terminal of the compressor 10, and the other terminal of the compressor 10 is connected to the other terminal of AC power 170.

In operation, a power-supply is provided to a refrigerator, the freezing compartment temperature sensor 91 and the refrigerating compartment temperature sensor 92 respectively sense a freezing compartment temperature and a refrigerating compartment temperature, the sensed freezing compartment temperature and the sensed refrigerating compartment temperature are transmitted to the controller 100. Particularly, when the refrigerating compartment temperature is above +10¢ºC., the cooling performance should be enhanced, so that a quick cooling of a refrigerating compartment is performed by increasing a cooling capacity of the refrigerating evaporator 61.

For this purpose, the controller 100 outputs a first control signal through the output terminal OP4. According to the first control signal, the fourth relay 150 is operated to drive the direction control valve 30, a liquid refrigerant from the condenser 21 flows into the first expansion device 41 via the first refrigerant passage 72.

The refrigerant from the first expansion device 41 is partially evaporated while passing through the freezing evaporator 51, and is then completely evaporated while passing through the refrigerating evaporator 61, so that the liquid refrigerant is changed to a complete vapor refrigerant, and then the complete vapor refrigerant is provided to a compressor 10.

In this way, a cool air is generated as the liquid refrigerant passes through the evaporators 51 and 61, the cool air is respectively discharged into the freezing compartment an the refrigerating compartment by the fans 52 and 62 so that the freezing compartment and the refrigerating compartment are cooled.

As described above, if a liquid refrigerant from the condenser 21 is directed to the first refrigerant passage 72, a cooling capacity of the refrigerating compartment becomes increased so that a quick cooling of the refrigerating compartment is performed.

After the quick cooling, if the refrigerator reaches a steady state wherein a refrigerating compartment temperature maintains a refrigerating compartment set temperature, the controller 100 outputs a second control signal to its output terminal OP4, changes a contact point between the fourth relay 150 and the direction control valve 30, and switches the direction control valve 30 to make the refrigerant from the condenser 21 direct the second refrigerant passage 73. Accordingly, since an intercooler evaporator is used for a steady state of the refrigerator not requiring a quick cooling of the refrigerating compartment, a cooling efficiency of the refrigerator is enhanced and a power saving effect is also obtained.

As the refrigerant is directed to the second refrigerant passage 73, the refrigerant from the condenser 21 is subcooled while passing through the inner tube 73a of the refrigerating evaporator 61, flow into the freezing evaporator 51 via the second expansion device 42, performs a cooling of the freezing compartment, passes through the outer tube 74 of the refrigerating evaporator 61, and finally returns to the compressor 10.

However, as described above, if the direction control valve 39 are switched such that the liquid refrigerant from the condenser 21 firstly pass through the second refrigerant passage 73, the following phenomenon occurs in the refrigerating evaporator 61 embodied as an intercooler evaporator. That is, a heat exchange between a low temperature refrigerant from the freezing evaporator 51 and a high temperature refrigerant discharged from the condenser 21 occurs in the refrigerating evaporator 61, a cooling capacity of the refrigerating evaporator 61 gradually disappears. To enhance the cooling capacity by using the disappeared cooling capacity, the controller 100 will be operated as follows.

Figure 4:
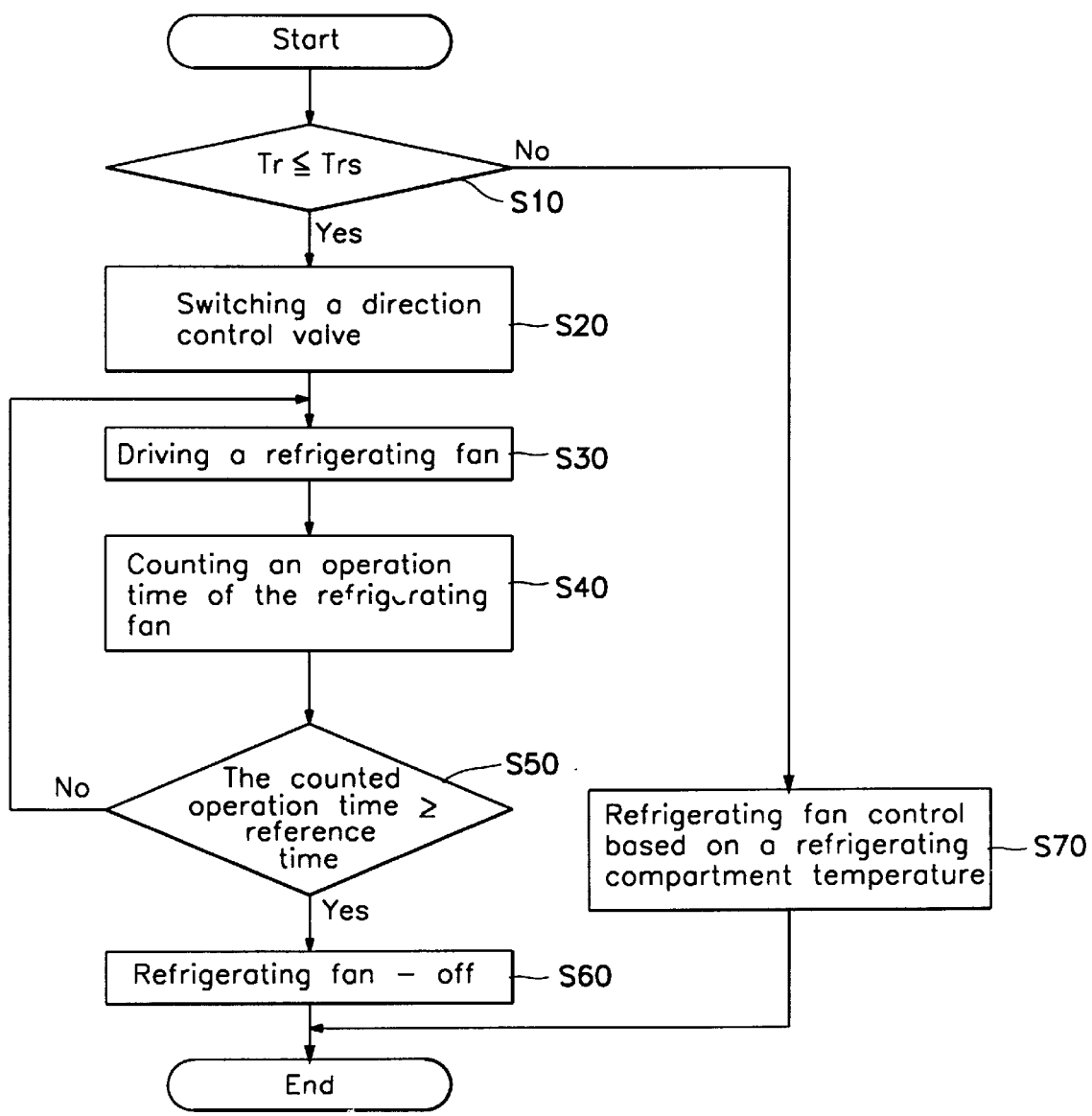
FIG. 4 is a flowchart illustrating a control method of a refrigerator having an intercooler evaporator.

FIG. 4 is a flowchart illustrating a control method of a refrigerator having an intercooler evaporator.

As shown in FIG. 4, the controller 100 determines (S10) whether the refrigerating compartment temperature Tr sensed by the refrigerating compartment temperature sensor 92 reaches a refrigerating compartment set temperature Trs so that a steady state of the refrigerator is provided or not.

If the steady state of the refrigerator is provided in the step S10, the controller 100 switches (S20) the direction control valve 30 from on-state to off-state so that a refrigerant directs the freezing evaporator 51 via the second refrigerant passage 73.

In the meantime, if the steady state of the refrigerator is not determined in the step S10, the controller 100 commonly controls an operation of the refrigerating fan 62 on the basis of the refrigerating compartment temperature sensed by the refrigerating compartment temperature sensor 92 (S70).

If the refrigerant directs the freezing evaporator 51 via the second refrigerant passage 73 by a switching of the direction control valve 30 in the step S20, the controller 100 drives a freezing fan 52 via the output terminal OP1, and generates a high level signal via the output terminal OP2. As s result, an inverter driver 112 connected to the output terminal OP2 generates a low level signal, operates a second relay 130, and then drives (S30) the refrigerating fan 62 connected to the second relay 130. By operation of the refrigerating fan 62, a residual cool capacity of the refrigerating evaporator 61 flows into the refrigerating compartment.

If the refrigerating fan 62 is driven, the controller 100 counts (S40) an operation time of the refrigerating fan 62 by using an inner timer in order to count an operation time of the refrigerating fan 62 after switching the direction control valve 30. After that, the controller 100 determines (S50) whether the counted operation time of the refrigerating fan 62 is beyond the reference time being predetermined to provide the refrigerating compartment with the residual cool air.

If the counted operation time of the refrigerating fan 62 reaches the reference time in the step S50, the controller 100 determines that the residual cool air is sufficiently employed, thereby turning off the refrigerating fan 62 (S60).

As described above, a control method of a refrigerator according to the present invention drives a refrigerating fan for a predetermined time when a refrigerant passage is converted to make a refrigerant from a condenser firstly pass a refrigerating evaporator, and enhances a cooling efficiency by applying a residual cool air of the refrigerating evaporator to a refrigerating compartment, after the refrigerating compartment reaches a steady state in a refrigerator having a refrigerating evaporator embodied as an intercooler evaporator.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. In a control method for a refrigerator including a compressor, a condenser, a freezing compartment temperature sensor and a refrigerating compartment temperature sensor, a freezing evaporator, a refrigerating evaporator being an intercooler evaporator, a freezing fan and a refrigerating fan, and a direction control valve for selectively directing a refrigerant discharged from the condenser to the first evaporator or the second evaporator, a control method for the refrigerator, comprising the steps of:

(a) determining whether a refrigerating compartment temperature sensed by the refrigerating compartment temperature sensor reaches a refrigerating compartment set temperature to determine a steady state of the refrigerating compartment;

(b) if it is determined that the steady state of the refrigerating compartment in the step (a), switching the direction control valve, and allowing a refrigerant to firstly pass the refrigerating evaporator;

(c) if the direction control valve is switched in the step (b), driving the refrigerating fan for a predetermined time simultaneously driving the freezing fan; and (d) after the refrigerating fan is driven for the predetermined time in the step (c), stopping the refrigerating fan.

2. A control method for the refrigerator according to claim 1, wherein the predetermined time in the step (c) is set to apply a residual cool air of the refrigerating evaporator after switching the direction control valve to the refrigerating compartment.

* * * * *